United States Patent [19]
Naruse et al.

[11] Patent Number: 5,599,230
[45] Date of Patent: Feb. 4, 1997

[54] AIR OUTLET STRUCTURE FOR AUTOMOTIVE AIR CONDITIONERS

[75] Inventors: Rikihei Naruse; Akihiko Sugimoto, both of Hamamatsu, Japan

[73] Assignee: Hyundai Electronics Industries Co., Ltd., Kyoungki-do, Rep. of Korea

[21] Appl. No.: 630,618

[22] Filed: Apr. 10, 1996

Related U.S. Application Data

[63] Continuation of Ser. No. 283,156, Aug. 3, 1994, abandoned.

[30] Foreign Application Priority Data

Sep. 21, 1993 [JP] Japan ..................... 5-257769

[51] Int. Cl.[6] .......................................... B60H 1/34
[52] U.S. Cl. .......................... 454/155; 454/315
[58] Field of Search .................... 454/109, 155, 454/315

[56] References Cited

U.S. PATENT DOCUMENTS 4,699,322  10/1987  Jobst .
4,796,518   1/1989  Murray ............................. 454/155
5,230,655   7/1993  Thompson et al. ............. 454/315 X

FOREIGN PATENT DOCUMENTS 1-182115  7/1989  Japan ............................. 454/155
2196421   4/1988  United Kingdom ............ 454/155

*Primary Examiner*—Harold Joyce
*Attorney, Agent, or Firm*—Gary M. Nath; Nath & Associates

[57] ABSTRACT

An air outlet structure for an air conditioner of an automobile having its instrument panel equipped with an air outlet. The air outlet structure comprises: a plurality of vertical fins disposed integrally turnably in the air outlet for controlling the horizontal flow of the conditioned air; a plurality of horizontal fins disposed integrally turnably in the air outlet for controlling the vertical direction of the conditioned air; a knob movably fitted on one of the horizontal fins or the vertical fins, which are positioned at the side of the air outlet, for turning the one fin; and a pair of legs formed at the back of the knob and engaging with one of the horizontal fins or the vertical fins, which are positioned at the deep side of the air outlet. The legs have their leading end portions formed into arcuate portions on the hinge pin of the fin which is fitted in the knob.

1 Claim, 9 Drawing Sheets

5,599,230

1

AIR OUTLET STRUCTURE FOR AUTOMOTIVE AIR CONDITIONERS

This application is a continuation of U.S. patent application Ser. No. 08/283,156, filed Aug. 3, 1994 now abandoned.

BACKGROUND OF THE INVENTION

1. Field of the Invention

The present invention relates to an air outlet structure for an air conditioner of an automobile having its instrument panel equipped with an air outlet of the air conditioner.

2. Related Art

As shown in FIGS. 11 and 12, an instrument panel 1 in an automotive compartment is formed at its two side portions with air outlets 2 for blowing out the conditioned air. This air outlet 2 is opened in a casing 4 which is connected to the downstream end of an air-conditioning duct 3 (as shown in FIG. 12) arranged in the instrument panel 1. The casing 4 is equipped in its inside with a fin 5 for controlling the flow direction of the conditioned air to be blown out (as shown in FIG. 13). Here will be described the structure of the fin S which is disposed in the air outlet 2, with reference to FIG. 14.

The fin 5 is composed of vertical fins 6 and horizontal fins 7, as shown. Of these, the vertical fins 6 are turnably disposed by a pin 8 in the upper and lower inner walls of the casing 4 at the side of the air outlet 2.

The casing 4 is equipped therein with a plurality of (e.g., three, as shown in FIG. 13) vertical fins 6, which are connected to one another by the (not-shown) connector for turning the fins 6 integrally.

On the other hand, the horizontal fins 7 are turnably disposed by a pin 9 at the back of the vertical fins 6, i.e., in the lefthand and righthand inner walls of the casing 4 at the deep side. The casing 4 is equipped therein with a plurality of (e.g., three, as shown in FIG. 12) horizontal fins 7 which are also connected to one another by the (not-shown) connector for turning the fins 7 integrally.

On the vertical fin 6 located at the center, moreover, there is movably fitted a knob 10 for turning the vertical fins 6 to the right or left and turning the horizontal fins 7 upward and downward. The knob 10 is equipped with two upper and lower rodshaped legs 11, as shown in FIG. 14, which are disposed at a spacing from each other (as shown in FIG. 15).

Between these two upper and lower legs 11, there is clamped a cross rod 12 which is projected upward from the horizontal fin 7. This horizontal fin 7 has its direction changed when the knob 10 is vertically moved.

Specifically, if the knob 10 movably fitted on the vertical fin 6 is moved up and down, as indicated by arrows A in FIG. 14, the horizontal fins 7 are vertically turned on the pin 9 to have their directions changed.

If, on the other hand, the knob 10 is horizontally turned, as indicated by arrows B in FIGS. 14 and 15, the vertical fins 6 are horizontally turned to have their directions changed.

Incidentally, there is another example, as shown in FIG. 16. In this example, a knob 13 is formed at its back portion formed into two upper and lower legs 14 which have their leading ends bifurcated into the shape of letter "Y". This knob 13 is fitted on the center vertical fin 6, as in the structure of FIG. 14, and the leading end portions of the legs 14 clamp the cross bar 12 which is formed on the horizontal fin 7. The horizontal fins 7 are vertically turned when the

2 knob 13 is vertically moved, but the legs 14 are prevented from coming out of the cross bar 12 when the knob 13 is horizontally turned.

Reference numeral 15 appearing in FIG. 12 designates a cover of the casing 4. Numeral 16 designates an air-conditioning casing disposed at the central portion of the instrument panel 1, and numeral 17 designates a cover of the casing 16. Moreover, numeral 18 designates a center duct, and numeral 19 designates a defroster. Still moreover, numeral 20 designates a defroster nozzle.

Incidentally, an air outlet grille is disclosed in Japanese Utility Model Laid-Open No. 78852/1989. According to the disclosure of this Laid-Open, a first louver group and a second louver group are arranged at the air outlet of the air duct. The air outlet grille further includes a lever fitted longitudinally slidably on a predetermined louver of the first group, and a fork having its one end of said predetermined louver and its other end fitted on a predetermined louver of the second group.

In the prior art thus far described, the legs of the knob have to be sufficiently elongated so that they may not come out of the cross rod of the horizontal fin when the knob is horizontally turned to turn the vertical fins horizontally. The legs of the fin may interfere, if elongated, with the horizontal fins when the knob is vertically moved to turn the horizontal fins vertically.

As a result, there arises a problem that serious restrictions are exerted upon the designed operating ranges of the fins and the knob and the shapes of the fins. If the knob has its legs shortened, on the contrary, there arises another problem that when the knob is horizontally turned the legs of the knob may come out of the cross rod to reduce the operating angle of the vertical fins.

On the other hand, the Y-shaped legs of the knob is accompanied by a problem that the legs come out of the cross rod like the aforementioned structure if a sufficient length cannot be retained for their length. This leads to another problem that the directivity of the air to be blown out is deteriorated.

Incidentally, the air outlet grille, as disclosed in Japanese Utility Model Laid-Open No. 78852/1989, is constructed of the lever disposed in the first louver group and the fork connecting the predetermined louver of the first group and the predetermined louver of the second group. Thus, this structure is troubled by a problem that it is complicated by the increased parts.

SUMMARY OF THE INVENTION

The present invention has been conceived to solve the aforementioned problems of the prior art and has an object to provide an air outlet structure for an automotive air conditioner, in which the leading end shape of the legs formed at the back of the knob is improved to improve the directivity of the conditioned air.

In order to solve the aforementioned problems, according to the present invention, there is provided, in an automobile having its instrument panel equipped with an air outlet for an air conditioner, an air outlet structure for an automotive air conditioner, comprising: a plurality of vertical fins turnably disposed in said air outlet for controlling the horizontal flow of the conditioned air; a plurality of horizontal fins turnably disposed in said air outlet for controlling the vertical direction of the conditioned air; a knob movably fitted on one of said horizontal fins or said vertical fins, which are positioned at the side of said air outlet, for turning said one fin; and a pair of legs formed at the back of said knob and engaging with one of said horizontal fins or said vertical fins, which are positioned at the deep side of said air outlet, said legs having their leading end portions formed into arcuate portions on the hinge pin of said fin which is fitted in said knob.

With this construction, therefore, the distance from the pin center to the leading ends of the legs is unchanged no matter what position the legs might be turned to, so that the legs can be prevented from coming out of the fins.

DESCRIPTION OF THE PREFERRED EMBODIMENTS

Figure 1:
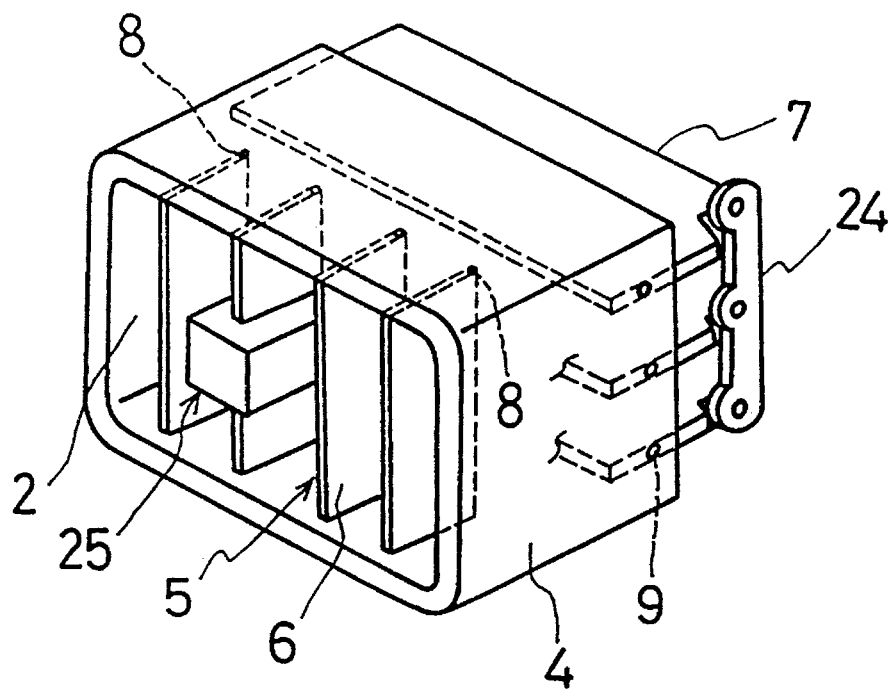
FIG. 1 is a perspective view showing one embodiment of the present invention.

The present invention will be described in the following in connection with its embodiments with reference to the accompanying drawings, in which the same parts as those of FIGS. 11 to 16 are designated at identical numerals. First of all, air outlets 2 formed in an instrument panel 1 will be briefly described with reference to FIGS. 11 and 12.

The air outlets 2 are opened in casings 4 which are fitted in the two sides of the instrument panel 1. The casings 4 have their backs connected to the end portions of air-conditioning ducts 3 arranged in the instrument panel 1. The other end portions of the air-conditioning ducts 3 are connected to the sides of a center duct 18 which in turn is connected to a defroster 19 having a defroster nozzle 20.

To the two side portions of the defroster 19, moreover, there are connected the end portions of demister ducts 21, which have their other end portions connected to a demister nozzle 22 and a side ventilator 23. In the central portion of the instrument panel 1, on the other hand, there is fitted a casing 16 of the center vent, to which is attached a cover 17.

Here will be described the casing 4 which is fitted in each side of the instrument panel 1, with reference to FIG. 1. The casing 4 is equipped with a fin 5 for changing the flow direction of the conditioned air from the air outlet 2.

The fin 5 is composed of vertical fins 6 and horizontal fins 7. The vertical fins 6 are attached to the casing 4 at the side of the air outlet 2, i.e., at the front side, whereas the horizontal fins 7 are attached to the deep side of the casing 4, i.e., to the casing 4 at the back of the vertical fins 6.

The vertical fins 6 are turnably hinged by pins 8 to the upper and lower inner walls of the casing 4. There are provided four vertical fins 6 in the casing 4 at the side of the air outlet 2. These vertical fins 6 are connected altogether by the (not-shown) connector for turning the fins 6 integrally.

On the other hand, the horizontal fins 7 are turnably hinged by pins 9 to the righthand and lefthand inner walls of the casing 4. There are provided three horizontal fins 7 in the deep side of the casing 4. These horizontal fins 7 are connected altogether by a connector 24 for turning the fins 7 integrally.

Figure 2:
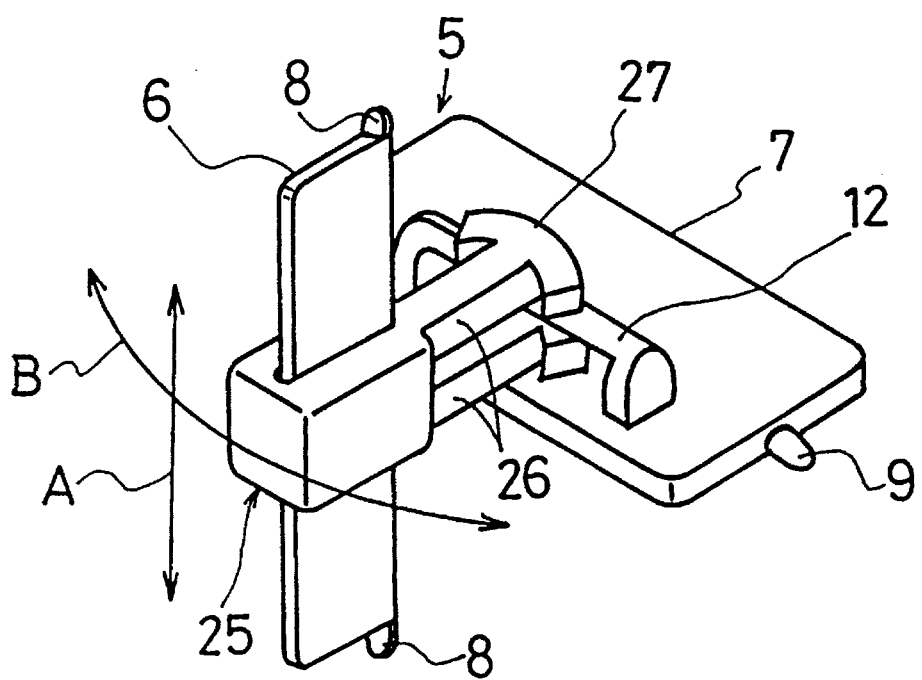
FIG. 2 is a perspective view showing an engaging state of vertical fins and horizontal fins.
Figure 4:
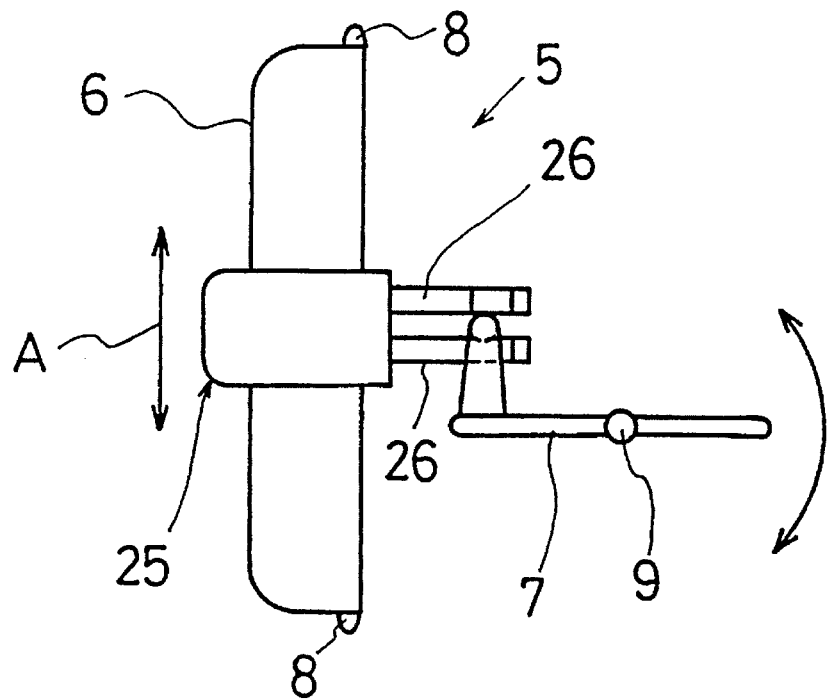
FIG. 4 is a side elevation of the structure of FIG. 2.

Here will be described a mechanism for changing the directions of the vertical fins 6 and the horizontal fins 7. FIGS. 2 and 4 show one vertical fin 6 and one horizontal fin 7 for illustrating the turning mechanism of the fin 5 in detail.

On the vertical fin 6, there is movably fitted a knob 25 for turning the vertical fins 6 horizontally and turning the horizontal fins 7 vertically. The knob 25 is equipped at its back side with two legs 26 which extend in vertical parallel with each other. The leading end portion of the leg 26 is shaped to form an arcuate portion 27 of a radius R on the axis of the vertical fins 6 fitted on the knob 25, i.e., on the pin 8 (as better shown in FIG. 3).

The arcuate portions 27 formed at the leading ends of the two upper and lower legs 26 clamp a cross bar 12 which is formed over the horizontal fin 7. When the know 25 is moved, the horizontal fin 7 is moved following the motion of the knob 25.

Here will be described the operations of the present embodiment. Since the present embodiment is constructed, as described above, the knob 25 fitted on the vertical fin 6 is moved vertically, as indicated by letter A in FIGS. 2 and 4. Then, the arcuate portions 27 of the legs 26 of the knob 25 push up and down the cross bar 12 of the horizontal fin 7 so that the horizontal fins 7 are vertically turned to have their directions changed.

Figure 3:
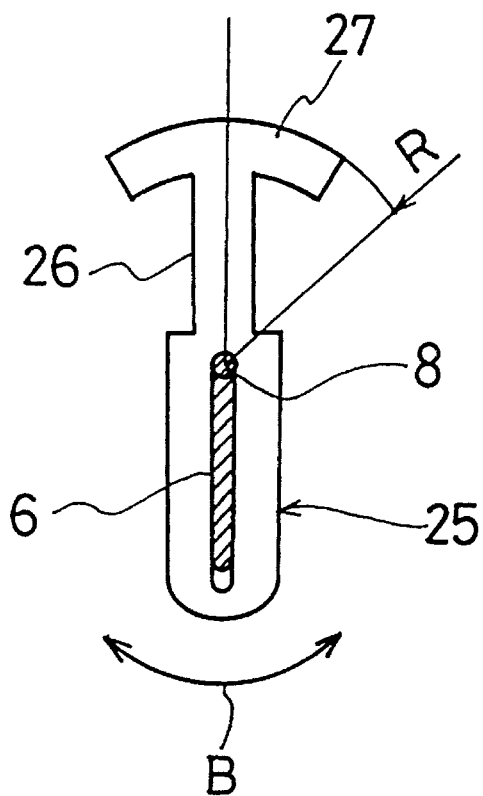
FIG. 3 is a top plan view showing a knob shown in FIG. 2.

If, on the other hand, the knob 25 is turned to the right or left, as indicated by letter B in FIGS. 2 and 3, the arcuate portions 27 of the legs 26 of the knob 25 are moved without any contact with the cross bar 12 so that they turn on a locus of the circuit having a radius R on the pin 8 of the vertical fin 6. As a result, the vertical fins 6 are turned to the right or left to have their directions changed.

Since the leading end portions of the legs 26 are thus shaped into the arcuate portions 27 having the radius R on the pin 8, the distance from the center to the arcuate portions 27 is kept so unchanged that the arcuate portions 27 of the legs 26 of the knob 25 will not come out of the cross bar 12 of the horizontal fin 7 even if the legs 26 of the knob 25 is turned. As a result, the directions of the horizontal fins 7 can be changed without fail even if the knob 25 is turned to the lefthand or righthand extremity and then moved upward or downward.

Figure 5:
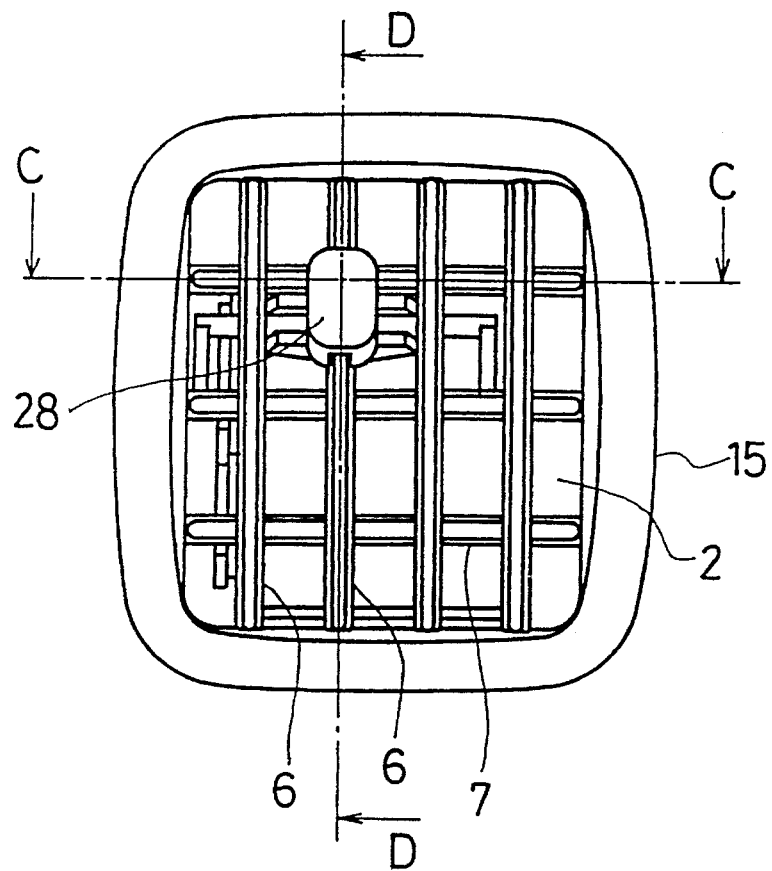
FIG. 5 is a front elevation showing another embodiment of the present invention.

Here will be described another embodiment with reference to FIGS. 5 to 7. This embodiment is characterized in that the legs 29 of a knob 28 fitted on the vertical fin 6 has its leading end portions formed into sector-shaped arcuate portions 30. Two upper and lower legs 29 having the sector-shaped arcuate portions 30 are projected from the back of the knob 28.

Figure 8:
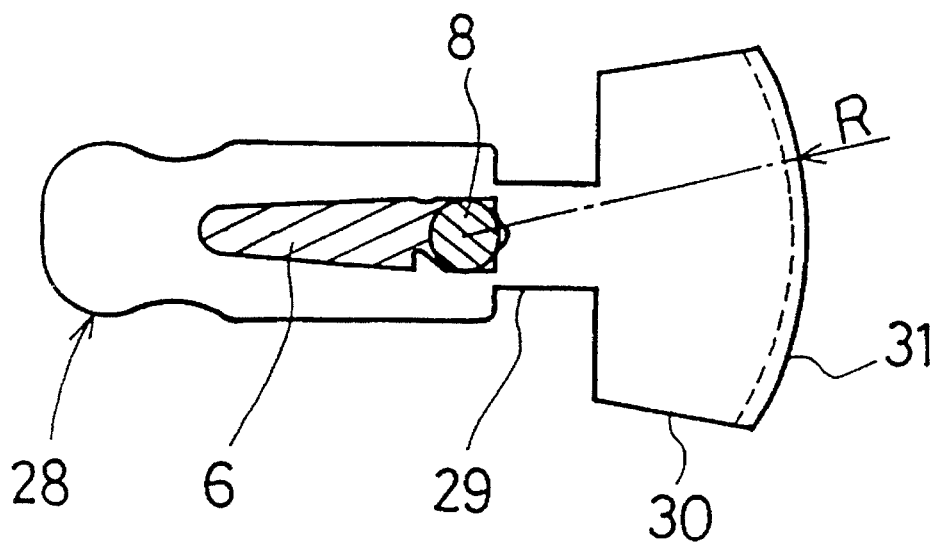
FIG. 8 is a top plan view showing a knob of FIG. 6.
Figure 9:
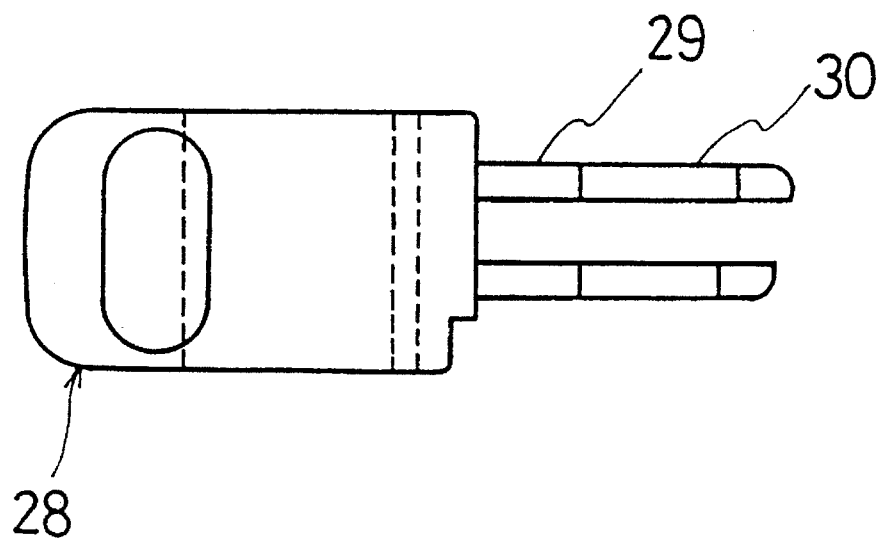
FIG. 9 is a front elevation showing the structure of FIG. 8.
Figure 10:
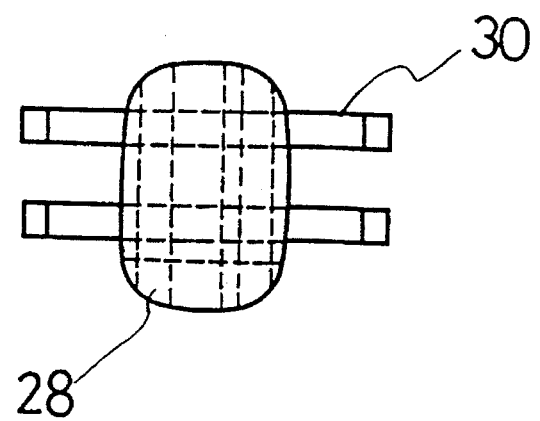
FIG. 10 is a lefthand side elevation showing the structure of FIG. 9.
Figure 11:
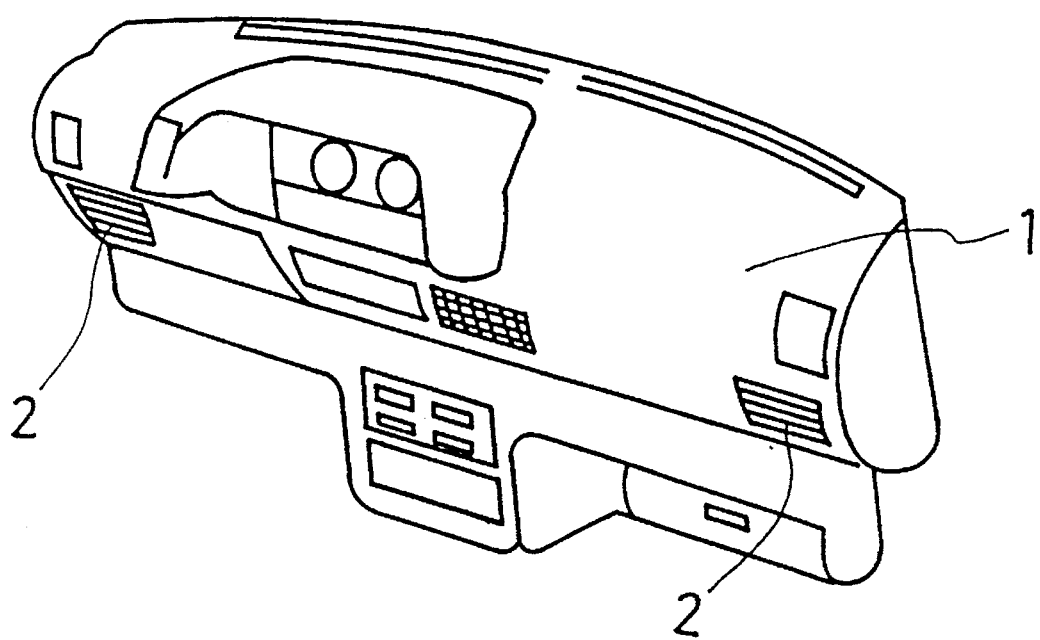
FIG. 11 is a perspective view showing the air outlet of an instrument panel.
Figure 12:
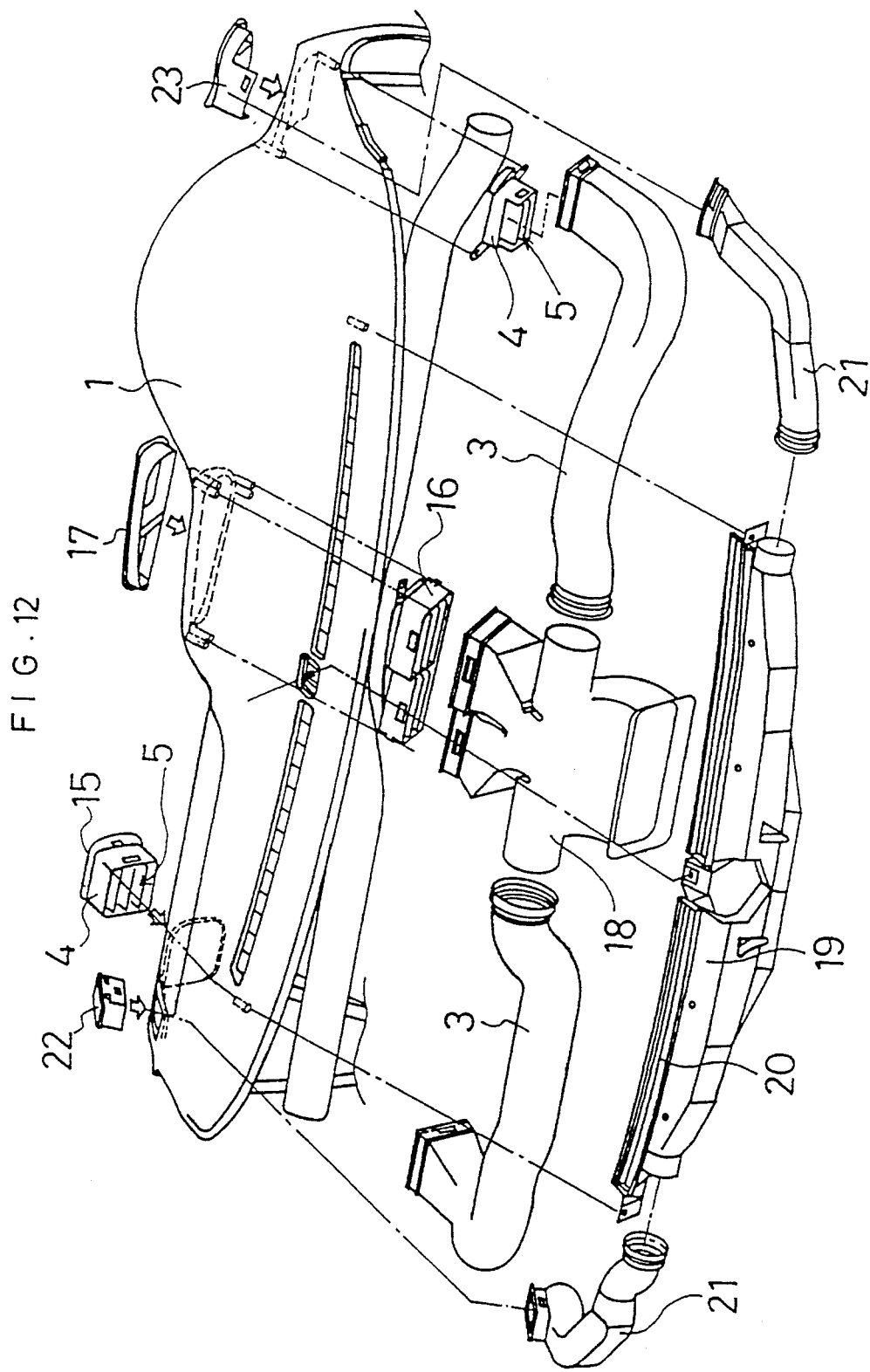
FIG. 12 is an exploded perspective view showing the inside of the instrument panel shown in FIG. 11.
Figure 13:
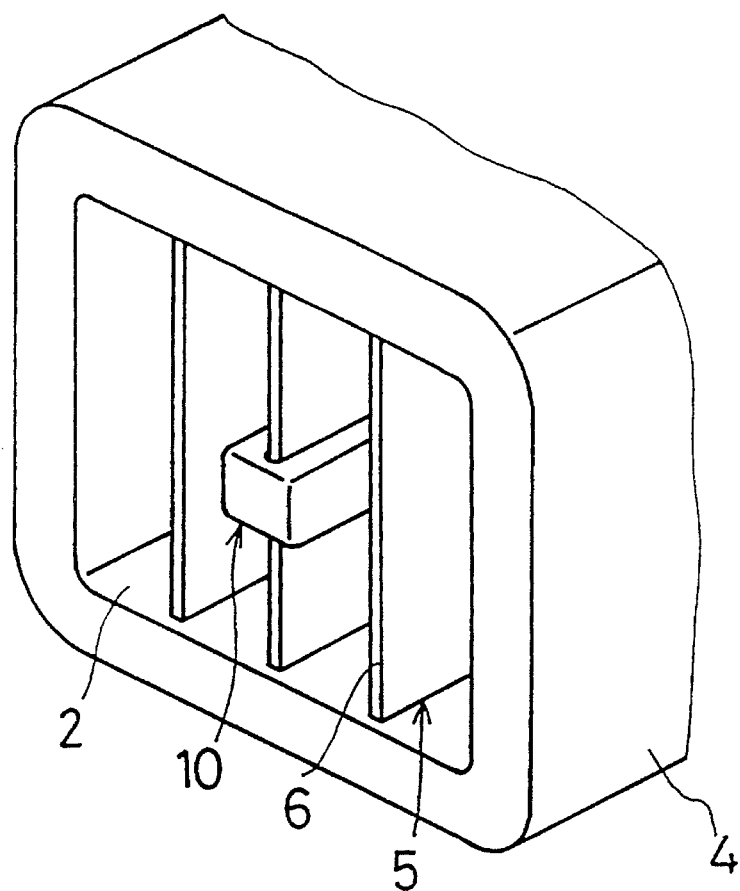
FIG. 13 is an enlarged perspective view showing the air outlet of FIG. 11.
Figure 14:
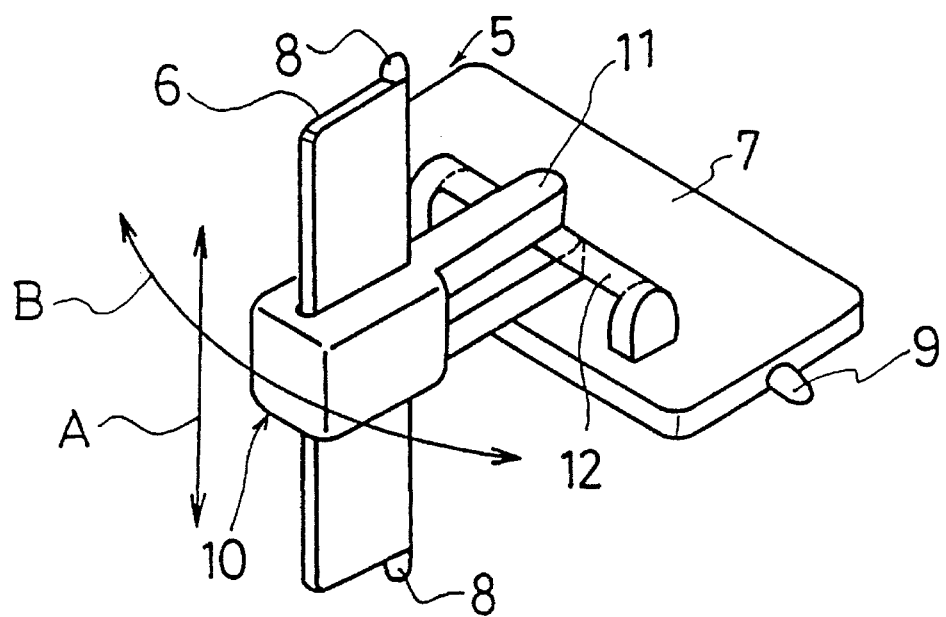
FIG. 14 is a perspective view showing an engaging state of vertical fins and horizontal fins of the prior art.
Figure 15:
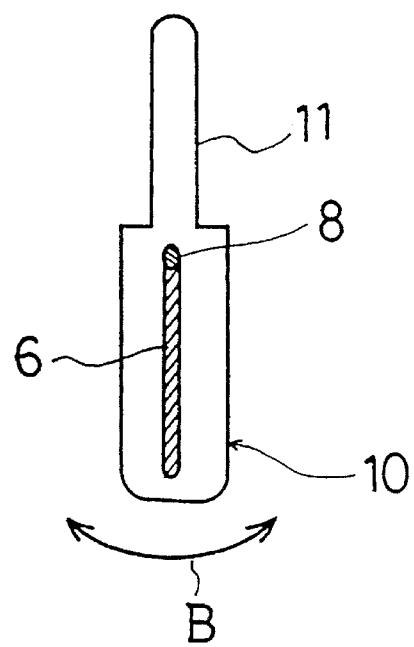
FIG. 15 is a top plan view showing a knob of FIG. 14.
Figure 16:
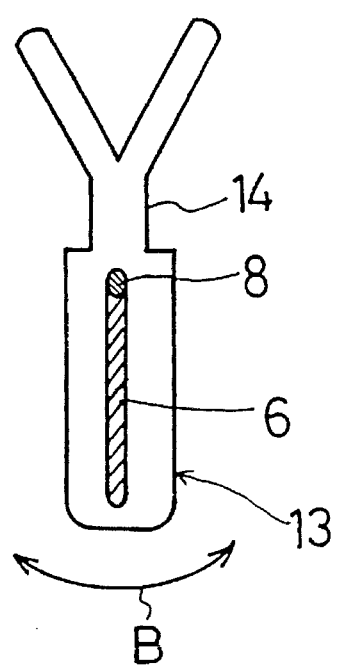
FIG. 16 is a top plan view showing a knob having its leading end portion bifurcated.

In FIGS. 8 to 10, there are shown the sector-shaped arcuate portions 80 which have their outermost edges 31 curved to have the radius R on the pin 8 of the vertical fin 6.

Here will be described the operations of the present embodiment. Since this embodiment is constructed, as described above, the knob 28 fitted on the vertical fin 6 is moved vertically, as indicated by letter A in FIG. 7. Then, the sector-shaped arcuate portions 30 of the legs 29 of the knob 28 push up and down the cross bar 12 of the horizontal fin 7 so that the horizontal fins 7 are vertically turned to have their directions changed.

Figure 6:
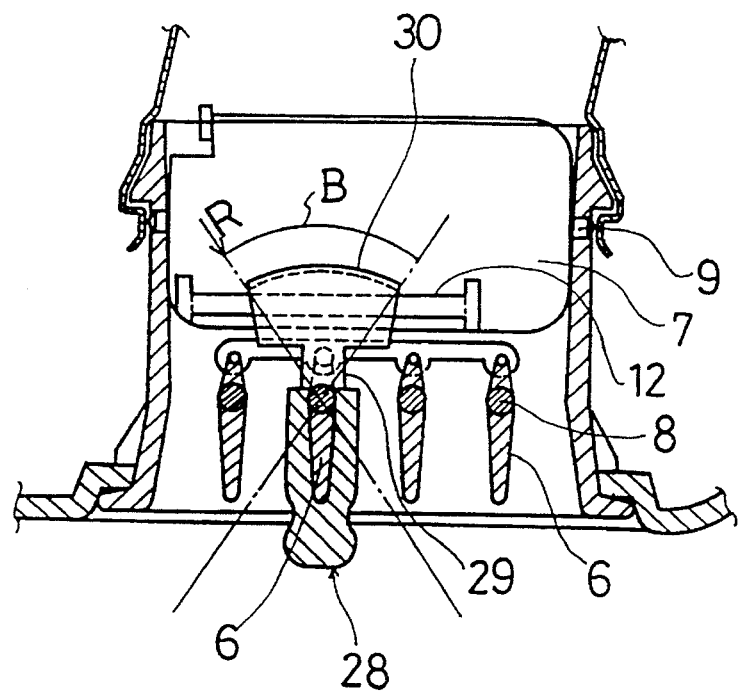
FIG. 6 is a section taken along line C—C of FIG. 5.
Figure 7:
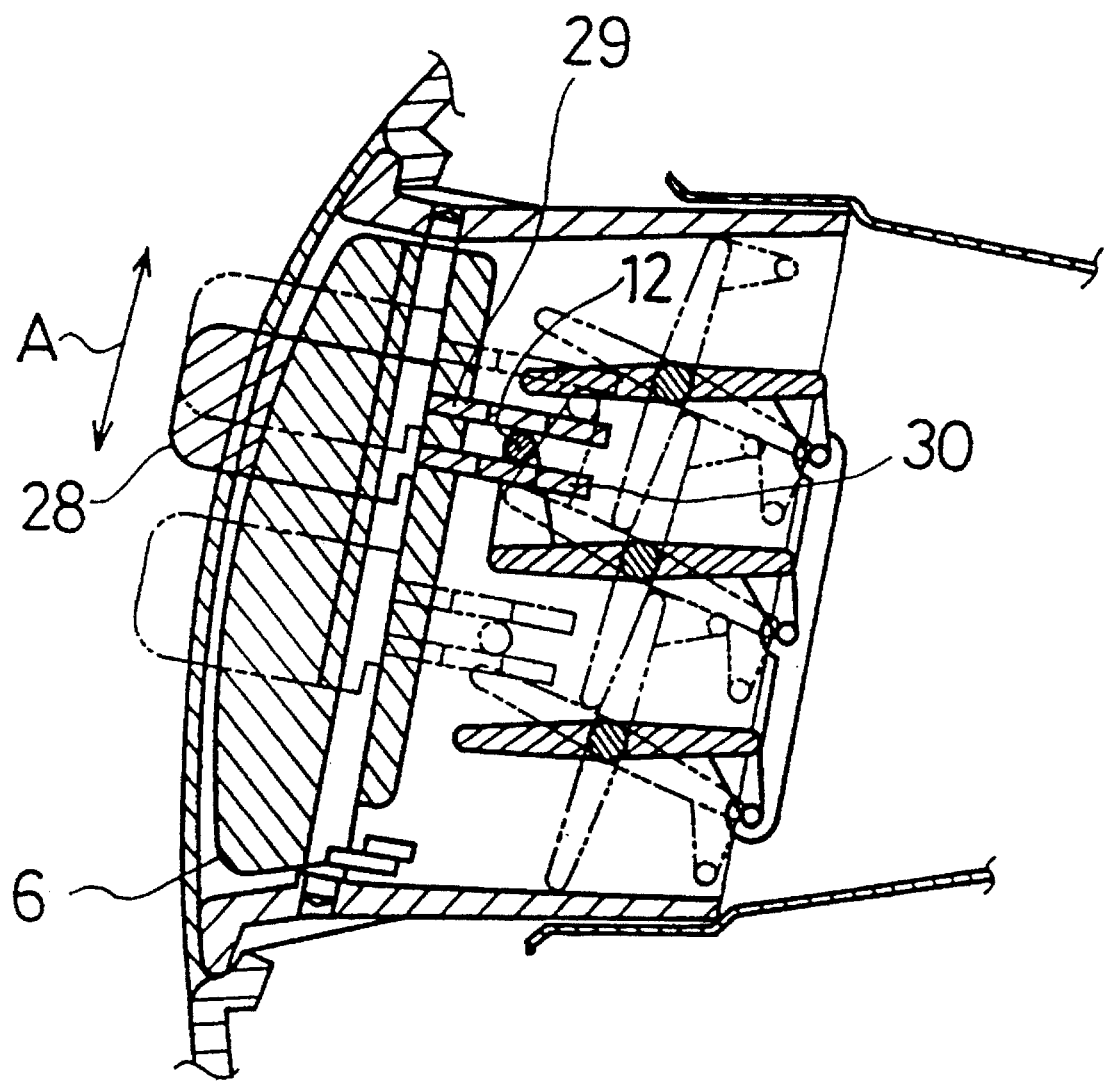
FIG. 7 is a section taken along line D—D of FIG. 5.

If, on the other hand, the knob 28 is moved to the right or left, as indicated by letter B in FIG. 6, its sector-shaped arcuate portions 30 turn along the circle having the radius R on the pin 8 of the vertical fin 6 without any contact with the cross bar 12 of the horizontal fin 7. At this time, the sector-shaped arcuate portions 30 are kept away from contact with the cross bar 12 so that they will not push up and down the cross bar 12. As a result, only the vertical fins 6 are turned to the right or left to have their directions changed.

Thus in the present embodiment, the leading end portions of the legs 29 are shaped into the sector-shaped arcuate portions 30 having the radius R on the pin 8. As a result, the distance from the center of the pin 8 to the outermost edges 31 of the sector-shaped arcuate portions 30 is kept so unchanged that the sector-shaped arcuate portions 30 of the legs of the knob 28 will not come out of the cross bar 12 of the horizontal fin 7 even if the legs 29 of the knob 28 are turned. As a result, the directions of the horizontal fins 7 can be changed without fail even if the knob 28 is turned to the lefthand or righthand extremity and then moved upward or downward.

According to the present invention, the leading end portions of the knob are formed into the arcuate portions on the pin of the fin fitted in the knob, as described above, the distance from the center of the pin of the fin to the leading end of the legs of the knob is always unchanged no matter what position the knob might be turned to. As a result, the knob does not have its legs disengaged from the fin even if it is turned. Thus, knob need not have its legs elongated to avoid the restrictions of the fins or knob upon their designed operating range or the fin shapes and to enlarge the operating angle of the fin fitted on the knob. Another effect is that the flow directivity of the air to be blown out can be improved.

What is claimed is:

1. An air outlet structure for an instrument panel mounted air outlet automotive air conditioner, comprising:

a plurality of vertical fins turnably disposed in said air outlet for controlling the horizontal flow of the conditioned air; said vertical fins positioned at the front side of a location within said air outlet;

each of said vertical fins including an integral pin;

a plurality of horizontal fins turnably disposed in the deep side of the outlet for controlling the vertical direction of the conditioned air;

each of said horizontal fins including an integral pin;

a knob slidably fitted on one of said vertical fins for turning said fins; and a pair of parallel legs formed at the back of said knob and engaging with an integral bar of one of said horizontal fins, for turning said horizontal fin, said parallel legs having their leading portions formed into an arcuate portion having a radius taken on said pin of said one of said vertical fins wherein said leading end portions trace a circular arc on said pin.

\* \* \* \* \*

UNITED STATES PATENT AND TRADEMARK OFFICE
CERTIFICATE OF CORRECTION

PATENT NO. : 5,599,230
DATED : February 4, 1997
INVENTOR(S) : Rikihei NARUSE et al It is certified that error appears in the above-identified patent and that said Letters Patent is hereby corrected as shown below:

Column 6, line 27, claim 6, between "said" and "fins"

insert -- vertical --

Signed and Sealed this

Tenth Day of June, 1997

Attest:

BRUCE LEHMAN

Attesting Officer

Commissioner of Patents and Trademarks